United States Patent [19]
Ito et al.

[11] 3,883,649
[45] May 13, 1975

[54] JOLIPEPTIN AND THE PROCESS FOR PRODUCING THE SAME

[75] Inventors: Mikiko Ito; Yasuo Koyama, both of Tokyo, Japan

[73] Assignee: Kayaku Antibiotic Research Co., Ltd., Japan

[22] Filed: Nov. 9, 1972

[21] Appl. No.: 305,081

[52] U.S. Cl. .................................................. 424/118
[51] Int. Cl. .......................................... A61k 21/00
[58] Field of Search ...................... 424/118; 195/80

[56] References Cited
OTHER PUBLICATIONS

Miller, The Pfizer Handbook of Microbial Metabolites, McGraw-Hill Book Co. Inc., 1961, N.Y., N.Y., pages 373–375.

Primary Examiner—Jerome D. Goldberg
Attorney, Agent, or Firm—Oblon, Fisher, Spivak, McClelland & Maier

[57] ABSTRACT

An antibiotic substance designated as jolipeptin, is produced by cultivating a strain of *Bacillus polymyxa subsp. colistinus* KOYAMA, and isolating and recovering the jolipeptin from the cultured broth.

2 Claims, No Drawings

JOLIPEPTIN AND THE PROCESS FOR PRODUCING THE SAME

BACKGROUND OF THE INVENTION

1. Field of the Invention

This invention relates to a novel antibiotic substance and to a process for producing the same.

2. Description of the Prior Art

It has been known that a cultured broth obtained by the fermentation of *Bacillus polymyxa subsp. colistinus* KOYAMA, will contain a colistin characterized by excellent antibiotic activities against Gram-negative bacteria.

It had been previously been discovered, that the above cultured broth also contains gatavalin, which has a different antimicrobial spectrum from that of colistin. Upon further research, it has now been found that *Bacillus polymyxa subsp. colistinus* KOYAMA will produce a new antibiotic, which has a different antimicrobial spectrum than either colistin or gatavalin. This new antibiotic substance will hereinafter be called "jolipeptin."

SUMMARY OF THE INVENTION

Accordingly, one object of the present invention is to provide a new antibiotic substance.

Another object of the present invention is to provide a process for isolating and recovering jolipeptin.

These and other objects have now herein been attained by fermentating *Bacillus polymyxa subsp. colistinus* KOYAMA, ATCC No. 21830, and isolating jolipeptin.

DESCRIPTION OF PREFERRED EMBODIMENTS

*Bacillus polymyxa subsp. colistinus* KOYAMA used in the present invention has the following properties:

Rods: 0.9 -- 1.1 × 4.5 --4.6 $\mu$, motile gram-positive, spore 1.0 --1.2 × 1.2 --1.5 $\mu$, ellipsoidal, central, Gelating stab: Liquefaction Glucose agar slant: Growth good, raised, glistening, gummy, with production of gas, translucent, lobate margin.

Glucose nitrate agar: Good growth, gummy.

Broth: Turbidity uniform, gummy sediment.

NaCl broth: No growth in 5 percent NaCl.

Milk: Coagulated with the production of gas, casein hydrolyzed.

Potato: Growth abundant, slimy, yellowish-brown, potato decomposed with the production of gas.

Indole: Not produced.

Utilization of carbon sources:

| Arabinose | + | Celobiose | + | Fructose | + | Galactose | + |
|---|---|---|---|---|---|---|---|
| Inulin | − | Lactose | + | Maltose | + | Mannose | + |
| Rhamnose | − | Sorbose | − | Sucrose | + | Salicin | − |
| Xylose | + | Adonitol | − | Dulcitol | − | Erythritol | − |
| Inocitol | − | Mannitol | + | Sorbitol | − | Citrate | − |
| Acetate | − | Succinate | − | Tartrate | − | | |

Starch: Hydrolyzed

Acetylmethylcarbinol is produced.

Nitrites produced from nitrates.

Biotin necessary for growth.

Antibiotics production:

Colistin, Gatavalin, Jolipeptin.

The cultured broth used in the present invention is prepared by conventional methods are ordinarily used for producing colistin. A variety of materials can be used in the culture medium as the nutritive source, although preferable are those materials which contain a source of nitrogen, such as peptone, wheat bran, wheat flour, corn steep liquor, meat extract, protein hydrolates, inorganic nitrate, ammonium salts or the like. A carbon source should also be present, such as dextrose, lactose, maltose, starch, glycerine, molasses or the like, and should be used in comparatively large quantities. Various inorganic salts, minor nutriments, and the like can also be added, if desired. In order to produce jolipeptin on a large scale, it is advantageous to use a submerged culture. The culture temperature should be about 28° to 35°C. The initial pH of the culture medium should be about pH 7.

The thus obtained cultured broth will contain colistin, gatavalin and jolipeptin. Since the jolipeptin exists in both the cultured liquid and in the cells, the jolipeptin is isolated by the following methods: (1) The cultured broth is filtered to remove the cells and the solid matter. A precipitant, such as benzaldehyde or ammonium sulfate is added to the filtrate, and the mixture of colistin, gatavalin and jolipeptin is precipitated. The precipitate is dissolved in acidic-water-saturated butanol solution, less than pH 5, and washed with acidic water, and the colistin is transferred to the acidic water and removed. Then a jolipeptin-insoluble solvent, such as ether, is added to the mother liquor to precipitate gatavalin and jolipeptin. The precipitated gatavalin and jolipeptin are then dissolved in methanol, or the like, and precipitated again by the addition of ether, or the like. When the precipitate is extracted with weak alkaline aqueous solution containing an organic base, such as triethylamine, trimethylamine, or Tween, etc., jolipeptin is dissolved in the above aqueous solution, while gatavaline remains in the precipitate. Tween is a polyoxyethylene derivative of fatty acid partial esters of sorbitol anhydrides. The aqueous solution containing jolipeptin is made acidic and extracted with butanol. Thereafter, jolipeptin is precipitated by the addition of ether, or the like. (2) The cells separated from the cultured broth are extracted while being agitated with a lower alcohol, such as methanol, ethanol, butanol, etc., and ether is added to the extract to precipitate jolipeptin. The precipitate is dissolved in the acidic-water-saturated butanol, and thereafter treated as mentioned in the above section (1).

Alternatively, the cells are broken by alumina grinding and extracted with a buffer solution of about pH 7, or with water, and thereafter it is treated as mentioned in section (1). (3) The filtrate of the cultured broth, or the extract of ruptured cells, is adsorbed onto an acidic resin such as Amberlite IRC-50,IR-120 (trade name of Rohm & Haas CO.), carboxymethylcellulose, etc., and jolipeptin is eluted with 0.5-N hydrochloric acid, ammonia, or the like. (4) A cultured broth containing the cells is directly extracted with a lower alcohol, such as butanol, or the like, and thereafter treated as mentioned in section (1).

The thus obtained jolipeptin is dissolved in methanol, or the like, and further refined with Sephadex LH-20 (trade name of Pharmacia Co.), etc.

PROPERTIES OF JOLIPEPTIN

1. Molecular weight: less than 3,000
2. Stability: aqueous solution of jolipeptin is stable more than one week under cold condition.

3. Ultraviolet absorption: end absorption
4. Solubilities: Soluble in water, methanol, ethanol, n-butanol and isopropanol, and insoluble in methyl acetate, ethyl acetate, butyl acetate, ethyl ether, petroleum ether, acetone, chloroform and benzene.
5. Ninhydrin reaction: positive
6. Paper chromatography: n-butanol : acetic acid : water (4 : 1 : 2)
   Rf = 0.65 ~ 0.70
7. Melting point: the decomposition point is more than 300°C.
8. Elementary analysis: C 49.66 percent, H 7.22 percent, N 13.10 percent
9. Amino acids composition

| | |
|---|---|
| α, γ-diaminobutyric acid | 2 (mol) |
| Serine | 2 |
| Alanine | 2 |
| Valine | 2 |
| Glutamic acid | 1 |
| Glycine | 1 |

10. Specific rotation:
    $[\alpha]_D^{22} + 14.0°$ ( C = 1 , ethyleneglycol)

Antimicrobial spectrum

| Organism | | Minimal inhibitory concentration (mcg/ml) |
|---|---|---|
| Escherichia coli | NIJH | 0.312 |
| Escherichia coli | B | 0.312 |
| Pseudomonas desmolytica | IFO12570 | 10 |
| Pseudomonas fluorescens | IFO3081 | 10 |
| Pseudomonas fluorescens | IFO3903 | 2.5 |
| Pseudomonas aeruginose | IFO3924 | 5.0 |
| Pseudomonas aeruginose | IFO3901 | 20 |
| Proteus mirabilis | IFO3849 | 40 |
| Proteus vulgaris | IFO3045 | 20 |
| Proteus vulgaris | IFO3167 | 20 |
| Staphylococcus aureus | 209P | 1.25 |
| Bacillus subtilis | PC1219 | 0.625 |
| Sarcina lutea | | 2.5 |
| Micrococcus lysodeikticus | | 0.625 |
| Mycobacterium tuberculosis | 607 | 10 |
| Candida albicans | | 40< |
| Candida krusei | | 40< |
| Saccharomyces cereviciae | | 40 |
| Saccharomyces rosei | | 40 |

12. Acute toxicities
    Intravenous injection for mice $LD_{50}$ = 5.21 mg/kg

Having generally described the invention, a further understanding can be obtained by reference to certain specific Examples which are provided herein for purposes of illustration only and are not to be construed as limiting of the invention unless specifically specified.

PRODUCTION OF JOLIPEPTIN

Example 1

Two liters of a 24-hour culture of *Bacillus polymyxa subsp. colistinus* KOYAMA grown at 30°C. in a reciprocal shaker was inoculated in a 500-liter fermenter containing 200 liters of medium. Culture fermentation was continued at 30°C. for 24 hours with adequate aeration. The medium contained 10 g starch, 5 g $(NH_4)_2SO_4$, 0.5 g $MgSO_4 \cdot 7H_2O$, 0.5 g $KH_2PO_4$, 3g $CaCO_3$, 0.5g NaCl, 150 mcg $MnSO_4$ and 10 mcg biotin per liter; pH 7.0.

ISOLATION OF JOLIPEPTIN

Example 2

The thus obtained cultured broth was filtered, and 200 ml. of the filtrate was adjusted to a pH of 8.0 ~ 8.6. There was added 0.5 to 1.5 percent of benzaldehyde to the solution and reacted for 30 minutes with stirring. The precipitate obtained was separated, extracted with 3 liters of acidic-water-saturated butanol of about pH 2.0, and then washed with hydrochloric acid of pH 2.0 to remove colistin. Ethyl ether was added to the butanol layer, precipitated material was separated and dissolved in methanol, then 2 to 3 times of ethyl ether was added thereto and precipitate was collected and dried. The precipitate was treated with an aqueous solution of triethylamine to dissolve only jolipeptin therein. The aqueous solution was made acidic, and extracted with n-butanol, and thereafter ethyl ether was added to the n-butanol layer to precipitate jolipeptin. The precipitate was then extracted with methanol, and ethyl ether was added thereto, and then the precipitate was collected and dried. Three grams of crude jolipeptin was obtained.

The crude jolipeptin was dissolved in methanol, and passed through a column of Sephadex LH-20, and then eluted with methanol. Thereafter, the active fraction was precipitated by the addition of ethyl ether to obtain a white powder of jolipeptin.

EXAMPLE 3

The procedure of Example 2 was carried out under the same conditions, except that ammonium sulfate was used instead of benzaldehyde, and that 1 to 2 percent of aqueous Tween solution was used instead of an aqueous triethylamine solution. Jolipeptin was obtained.

EXAMPLE 4

The cultured broth prepared as in Example 1 was filtered, and the filtrate was adsorbed on Amberlite IRC-50($H^+$) in 1/5 volume of the filtrate, and then eluted with 0.5 N-hydrochloric acid. An active fraction of jolipeptin was collected, and extracted with butanol. The extract was treated as mentioned in Example 1, and jolipeptin was obtained.

EXAMPLE 5

The cultured broth prepared as in Example 1 was centrifugally separated into the bacterial cells and the supernatant, and only the cells were used. 100 g. of the cells were extracted with 500 ml. of methanol while being agitated, and ethyl ether was added to the extract to obtain a precipitate. The precipitate was dissolved in acidic-water-saturated butanol, and the solution was treated as mentioned in Example 2, and jolipeptin was obtained.

EXAMPLE 6

100 g. of the cells prepared as in Example 5 were ground with 200 g. of alumina, and extracted with 500 – 1,000 ml. of 0.1M phosphate buffer of pH 7. The extract was centrifuged, and the supernatant was refined as mentioned in Example 2, and jolipeptin was obtained.

EXAMPLE 7

The cultured broth prepared as in Example 1 was adjusted at pH 2.0, and extracted with 1/5 volume of n-butanol. The n-butanol layer was washed with acidic water of pH 2.0, and treated as in Example 2. Jolipeptin was obtained.

Having now fully described the invention, it will be apparent to one of ordinary skill in the art that many changes and modifications can be made thereto without departing from the spirit or scope of the invention as set forth herein. ACCORDINGLY,

What is claimed and intended to be covered by letters Patent is:

1. A process for producing the jolipeptin, which comprises cultivating a strain of *Bacillus polymyxa subsp. colistinus* KOYAMA, ATCC No. 21830 in a cultured broth containing a nitrogen source and a carbon source at a culture temperature of about 28° – 35°C, until a sufficient amount of jolipeptin has been imparted too said broth.

2. Jolipeptin produced by the process of claim 1 and having the following characteristic properties:

Molecular weight: less than 3,000.
Melting point: the decomposition point is more than 300°C.
Elementary analysis: C 49.66 percent, H 7.22 percent, N 13.10 percent.
Specific rotation: $[\alpha]_D^{22} + 14.0°$ (C = 1,ethyleneglycol)
Amino acid composition: $\alpha, \gamma$-diaminobutyric acid (2 mol), serine (2 mol), alanine (2 mol), valine (2 mol), glutamic acid (1 mol), glycine (1 mol).
Ninhydrin reaction: positive.
Paper chromatography: n-butanol : acetic acid : water
(4 : 1 : 2)
Rf = 0.65 ~ 0.70.

* * * * *